(12) United States Patent
Lee et al.

(10) Patent No.: US 8,082,370 B2
(45) Date of Patent: Dec. 20, 2011

(54) APPARATUS, METHOD, AND SYSTEM FOR CONTROLLING COMMUNICATION BETWEEN HOST DEVICE AND USB DEVICE

(75) Inventors: Tae-hun Lee, Suwon-si (KR); Jin-ho Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 11/935,547

(22) Filed: Nov. 6, 2007

(65) Prior Publication Data

US 2008/0244109 A1 Oct. 2, 2008

(30) Foreign Application Priority Data

Mar. 30, 2007 (KR) ........................ 10-2007-0031732

(51) Int. Cl.
*G06F 3/00* (2006.01)
*G06F 13/14* (2006.01)

(52) U.S. Cl. ............................. 710/15; 710/19; 710/305
(58) Field of Classification Search .................... None
See application file for complete search history.

(56) References Cited

U.S. PATENT DOCUMENTS

| | | | | |
|---|---|---|---|---|
| 5,774,657 | A * | 6/1998 | Okamura et al. | 395/200.6 |
| 6,021,506 | A | 2/2000 | Cho et al. | |
| 6,058,441 | A * | 5/2000 | Shu | 710/100 |
| 6,073,193 | A | 6/2000 | Yap | |
| 6,119,194 | A | 9/2000 | Miranda et al. | |
| 6,219,736 | B1 * | 4/2001 | Klingman | 710/129 |
| 6,266,715 | B1 * | 7/2001 | Loyer et al. | 710/22 |
| 6,272,644 | B1 | 8/2001 | Urade et al. | |
| 6,418,374 | B2 * | 7/2002 | Sakamoto et al. | 701/209 |
| 7,194,638 | B1 * | 3/2007 | Larky | 713/300 |
| 7,200,712 | B2 * | 4/2007 | Ogura | 711/108 |
| 7,424,231 | B2 * | 9/2008 | Shigeta | 399/8 |
| 7,702,825 | B2 * | 4/2010 | Howard | 710/18 |
| 2002/0169915 | A1 * | 11/2002 | Wu | 710/305 |
| 2005/0278460 | A1 * | 12/2005 | Shin et al. | 710/1 |
| 2006/0242348 | A1 * | 10/2006 | Humphrey et al. | 710/305 |
| 2007/0005824 | A1 | 1/2007 | Howard | |
| 2007/0028127 | A1 * | 2/2007 | Kim | 713/310 |

(Continued)

FOREIGN PATENT DOCUMENTS

KR 2000-51115 8/2000

OTHER PUBLICATIONS

"Universal Serial Bus Mass Storage Specification for Bootability", Revision 1.0, Oct. 25, 2004, p. 6.*

(Continued)

*Primary Examiner* — Tariq Hafiz
*Assistant Examiner* — Dayton Lewis-Taylor
(74) *Attorney, Agent, or Firm* — Jefferson IP Law, LLP (57) ABSTRACT

An apparatus, a method, and a system for controlling communications between a host device and a USB device. The apparatus includes a controller to perform an operation for communication between a first device and a second device, and a first processor to selectively stop the operation of the controller according to information indicating a status of the communication between the first device and the second device. Thus, the USB device can perform a unique function even when the USB device is connected to the host via USB.

17 Claims, 4 Drawing Sheets

U.S. PATENT DOCUMENTS

| | | | | |
|---|---|---|---|---|
| 2007/0079173 | A1* | 4/2007 | Park et al. | 714/8 |
| 2007/0088796 | A1* | 4/2007 | Liu et al. | 709/217 |
| 2008/0005395 | A1* | 1/2008 | Ong et al. | 710/36 |
| 2008/0028113 | A1* | 1/2008 | Guo et al. | 710/104 |

OTHER PUBLICATIONS

Bi Bo; Sun Shuying; Wang Chunping; , "Design of Data Acquisition Equipment Based on USB," Electronic Measurement and Instruments, 2007. ICEMI '07. 8th International Conference on , vol., No., pp. 1-866-1-869, Aug. 16, 2007-Jul. 18, 2007 doi: 10.1109/ICEMI.2007.4350590 URL: http://ieeexplore.ieee.org/stamp/stamp.jsp?tp=&arnumber=4350590&isnumber=435039.*

Hathaway, T.; Verma, V.; , "Advanced low power system design techniques using the universal serial bus microcontroller," Northcon/96 , vol., No., pp. 270-274, Nov. 4-6, 1996 doi: 10.1109/NORTHC.1996.564926 URL: http://ieeexplore.ieee.org/stamp/stamp.jsp?tp=&arnumber=564926&isnumber=12266.*

Lu, H.K.; Ali, A.; , "Communication Security between a Computer and a Hardware Token," Systems, 2008. ICONS 08. Third International Conference on , vol., No., pp. 220-225, Apr. 13-18, 2008 doi: 10.1109/ICONS.2008.36 URL: http://ieeexplore.ieee.org/stamp/stamp.jsp?tp=&arnumber=4497126&isnumber=4497080.*

Office Action issued in corresponding European Patent Application No. 08100014.3 dated Jul. 8, 2008.

* cited by examiner

APPARATUS, METHOD, AND SYSTEM FOR CONTROLLING COMMUNICATION BETWEEN HOST DEVICE AND USB DEVICE

CROSS-REFERENCE TO RELATED APPLICATION

This application claims the benefit of Korean Patent Application No. 2007-31732, filed in the Korean Intellectual Property Office on Mar. 30, 2007, the disclosure of which is incorporated herein by reference.

BACKGROUND OF THE INVENTION

1. Field of the Invention

Aspects of the present invention relate to an apparatus, a method, and a system for controlling communications between a host device and a USB device, and more particularly, to a USB device that can be used even during communications or charging via a USB without physically cutting a connection with a host device when no operations are performed in the host device, and a corresponding method.

2. Description of the Related Art

The Universal serial bus (USB) was created to standardize an interface for a connection between a computer and a computer peripheral, such as a mouse, a keyboard, a printer, a modem, or a speaker. Communication via USB accelerates installation and removal of complex adapters, such as drivers. For this reason, USB is now standard equipment in most PCs. USB has recently been used to transmit data and voices not only from computer peripherals, such as a modem or a printer, but also from home multimedia devices, such as telephones or audio players. USB is used even when data is transmitted from a cell phone or a digital camera to a host device.

Figure 1:
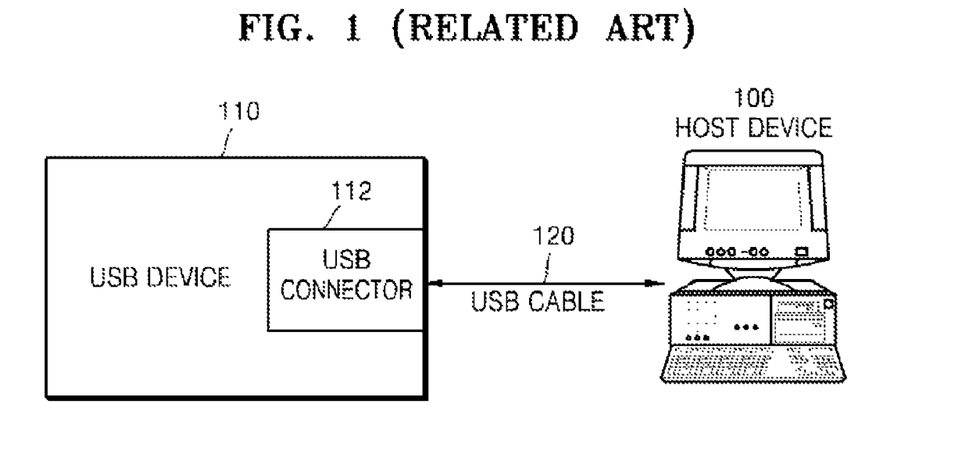
FIG. 1 illustrates a USB device connected to a host device via a USB cable.

FIG. 1 illustrates a USB device 110 connected to a host device 100 via a USB cable 120. The USB device 110 is connected to the host device 100 by linking the USB cable 120 to a USB connector 112 included in the USB device 110. The USB device 110 and the host device 100 transmit/receive data to/from each other through the linked USB cable 120. Computer peripherals and multimedia devices may be used as the USB device 110. A PC may be used as the host device 100.

Figure 2:
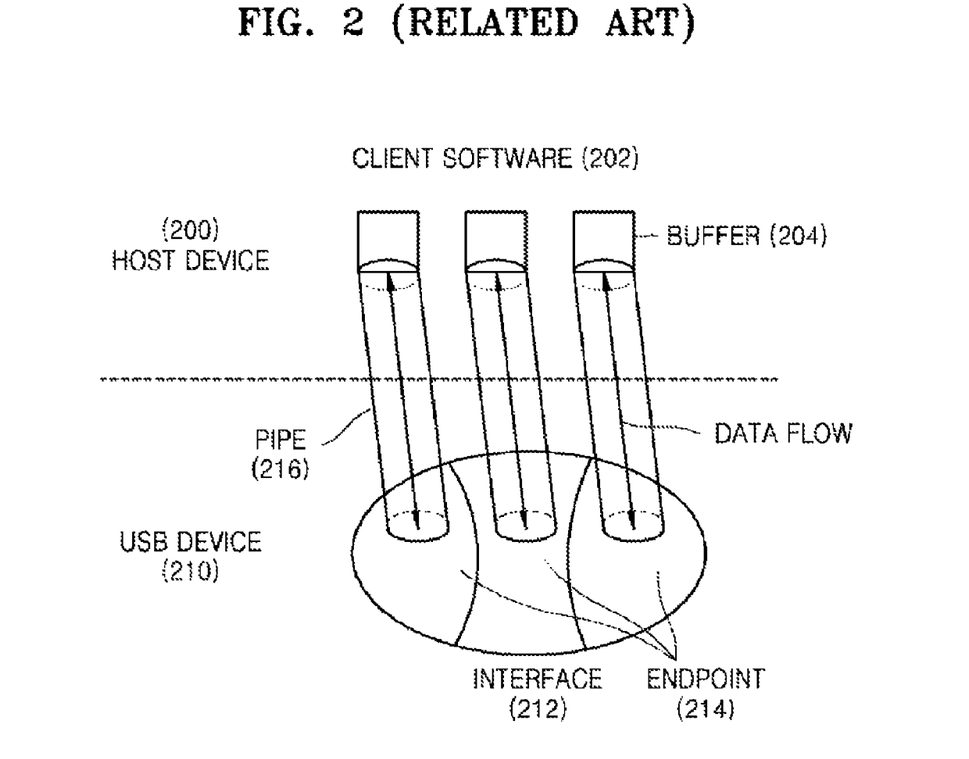
FIG. 2 illustrates a structure for data transmission between a host device and a USB device.

FIG. 2 illustrates a structure for data transmission between a host device 200 and a USB device 210. The host device 200 includes a client software 202 and a plurality of memory buffers 204. Pipes 216 are connected to each of the buffers 204. The pipes 216 are connected to endpoints 214 in the USB device 210, such that the pipes 216 serve as tunnels for communications between the host device 200 and the USB device 210. The endpoints 214 are grouped to form an interface 212. The client software 202 in the host device 200 communicates with the USB device 210 via a communication set. As described above, the data transmission between the host device 200 and the USB device 210 is carried out via the endpoints 214. The data transmission is always carried out in a form where a host controller (not shown) processes the endpoints 214 of the USB device 210. The USB device 210 cannot transmit data without a request or permission.

Figure 3:
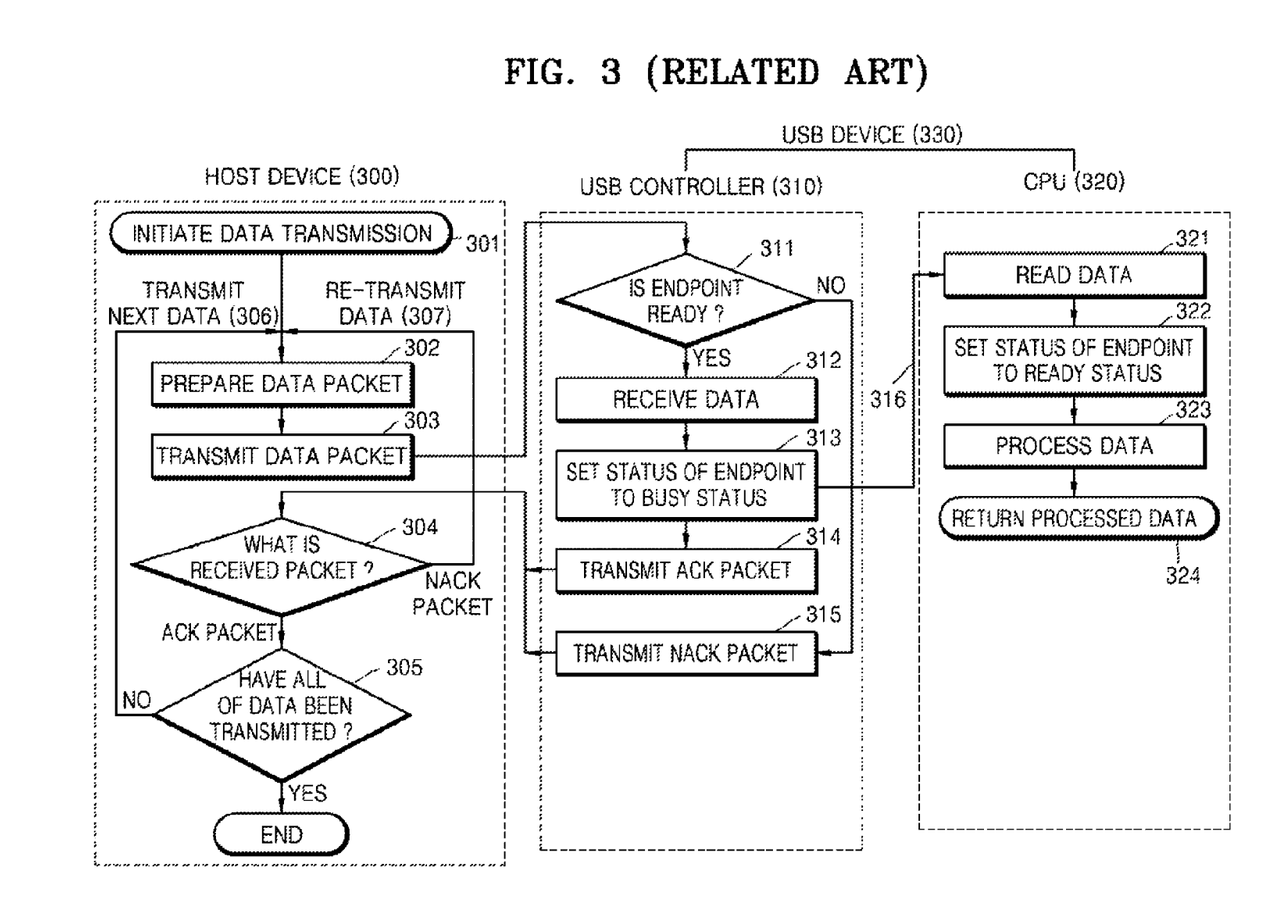
FIG. 3 is a flowchart of a data process between a host device and a USB device.

FIG. 3 is a flowchart of a data process between a host device 300 and a USB device 330. FIG. 3 shows a data process between the host device 300, a USB controller 310, and a central processing unit (CPU) 320 and particularly, shows a bulk data transmission. The USB controller 310 and the CPU 320 are part of the USB device 330.

In operation 301, an application initiates a data transmission. In operation 302, the host device 300 prepares a data packet to be transmitted. In operation 303, when the data packet is prepared, the host device 300 transmits the prepared data packet to the USB controller 310 of the USB device 330. In operation 311, the USB controller 310 checks whether an endpoint is ready for the data packet received from the host device 300. If the endpoint is ready, operation 312 is performed. If the endpoint is not ready, operation 315 is performed.

In operation 312, the USB controller 310 receives data if the endpoint is in a ready status. In operation 313, the USB controller 310 sets the status of the endpoint to a busy status, and in operation 314, the USB controller 310 transmits an ACK packet to the host device 300. If the status of the endpoint is set to be a busy status in operation 313, the USB controller 310 informs the CPU 320 of the set status by interrupting the CPU 320 of the USB device 330 while operation 314 is being performed in operation 316. If the endpoint is not in a ready status, the USB controller 310 transmits a NACK packet to the host device 300 in operation 315.

Looking at the host device 300, the host device 300 checks the data packet received from the USB controller 310 in operation 304. If the received data packet is the ACK packet, operation 305 is carried out. If the received data packet is the NACK packet, the data is re-transmitted in operation 307. In operation 305, the host device 300 checks whether all of the data is transmitted. If all of the data has been transmitted, the data process is concluded. If not all of the data is transmitted, next data is transmitted in operation 306.

Looking at the CPU 320, in operation 321, the CPU 320 processes the data received from the host device 300 by, for example, reading and storing the received data in a memory. In operation 322, the CPU 320 sets the status of the endpoint to a ready status and allows the USB controller 310 to receive the next data. The CPU 320 processes the received data in operation 323, and returns the processed data to the USB controller 310 in operation 324.

As described above, while the USB device 330 is connected to the host device 300, the USB device 330 cannot recognize the time when the host device 300 will transmit data, because a communication process, that is, data transmission/reception, always starts from the host device 300. Accordingly, the USB device 330 cannot perform other unique operations of the USB device during USB communications. The operation of the USB device 330 is determined according to the type of data received from the host device 300, and the capacity of a process for communications between the USB device 330 and the host device 300 is large. Accordingly, when the USB device 330 performs any operation without knowing the status of the host device 300, the communications between the USB device 330 and the host device 300 may collide with the unique operation performed by the USB device 330. This may interrupt the communications of the USB device 330 with the host device 300.

SUMMARY OF THE INVENTION

Aspects of the present invention provide an apparatus, a method, and a system for controlling communications between a host device and a USB device. More particularly, aspects of the present invention provide a USB device that can be used even during communications or charging using a USB without physically cutting a USB connection with a host device when no operations are performed in the host device by controlling communications between the host device and the USB device, and corresponding a method.

According to an aspect of the present invention, an apparatus to control communications between a first device and a second device is provided. The apparatus includes a controller to perform an operation for communications between the first device and the second device; and a first processor to selectively stop the operation of the controller according to information indicating a status of the communications between the first device and the second device.

According to another aspect of the present invention, a communications controlling method in a second device which communicates with a first device is provided. The method includes obtaining information indicating a status of the communications between the first device and the second device; and selectively stopping an operation for the communication between the first device and the second device according to the obtained information.

According to another aspect of the present invention, a computer readable recording medium is provided. The computer readable medium has recorded thereon a program to execute the above-described communications controlling method.

According to another aspect of the present invention, a system to control communications between a first device and a second device is provided. The system includes the first device; the second device to perform an operation for communications with the first device and to stop the operation according to information indicating a status of the communication with the first device; and a third device to perform an operation for the communications between the first device and the second device according to the information indicating the status of the communications between the first device and the second device.

According to the apparatus, the method, and the system for controlling the communications between the host device and the USB device, the USB device can perform its unique functions even while connected to the first device, when the status of communications between the first device and the second device is an idle status.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4A:
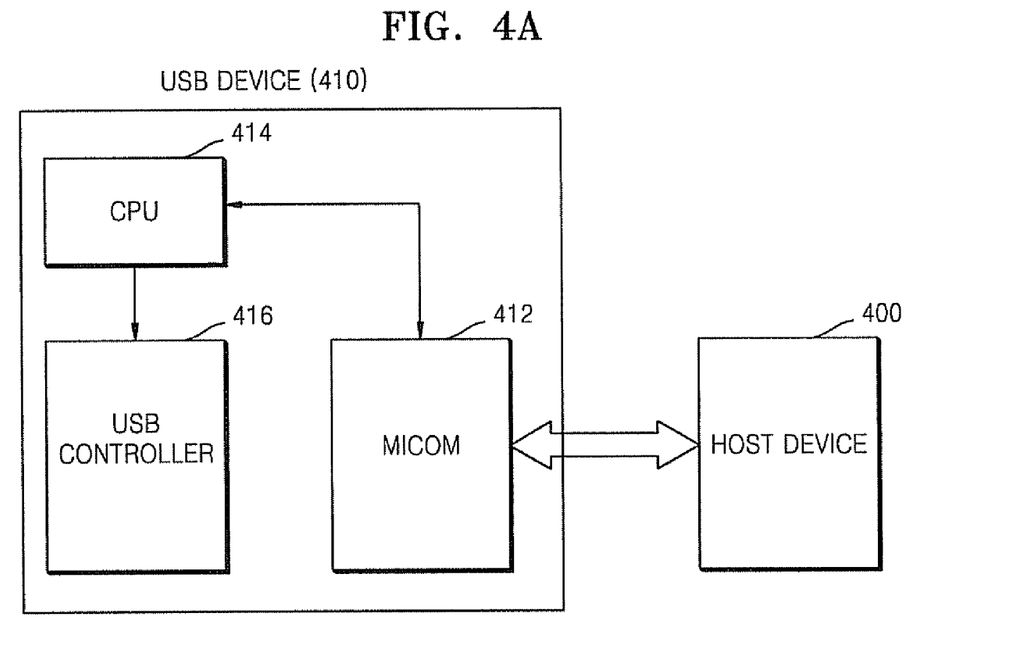
FIG. 4A illustrates an operation of a USB device according to an embodiment of the present invention when a status of communications between the USB device and a host device is an idle status.

FIG. 4A illustrates an operation of a USB device 410 according to an embodiment of the present invention when a status of communications between the USB device 410 and a host device 400 is an idle status. The USB device 410 may be any device including a USB port, such as a desktop computer, laptop computer, mobile phone, personal entertainment device, or personal digital assistant. Although described with respect to USB, the invention is not limited thereto; aspects of the present invention may be applied to devices communicating using other known standards and protocols, such as IEEE 1394 (Firewire). Wired or wireless standards may be employed, including Wireless USB.

The USB device 410 includes a microcomputer (MICOM) 412, a central processing unit (CPU) 414, and a USB controller 416. The USB device 410 varies its operation according to the status of communications between the USB device 410 and the host device 400. The status of communications between the USB device 410 and the host device 400 corresponds to the status of an operation of the host device 400. The status of communications between the USB device 410 and the host device 400 can be classified into an operation status where data for operations between the USB device 410 and the host device 400 is exchanged and an idle status where the data for operations between the USB device 410 and the host device 400 is not exchanged. The USB device 410 performs different communications with the host device 400, depending on whether the host device 400 is in the operation status or in the idle status.

An operation of the USB device 410 when the status of communications between the USB device 410 and the host device 400 is an idle status will now be described referring to FIG. 4A. Generally, when the USB controller 416 transmits/receives data to/from the host device 400 connected with the USB device 410, the MICOM 412 stores the data transmitted/received between the host device 400 and the USB controller 416 while the host device 400 is not performing operations involving the USB device 410.

When the host device 400 is in an idle status, the MICOM 412 obtains data from the host device 400 indicating that the host device 400 is in the idle status, informs the CPU 414 that the host device 400 is in the idle status, and continuously responds to USB-connection confirming data transmitted by the host device 400. Although the MICOM 412 illustrated in FIG. 4A is located within the USB device 410, the MICOM 412 may be installed outside the USB device 410. As described above, when the host device 400 is in the idle status, the MICOM 412 transmits/receives the data to/from the host device 400 without exchanging data for operations between the USB controller 416 and the host device 400. As a result, the USB device 410 can perform its own unique operations even while connected to the host device 410.

The CPU 414 controls the entire USB device 410, including the operations of the USB controller 416. The CPU 414 stops an operation of the USB controller 416 when it is determined that a USB transfer is not required by the USB device 410 according to the policy of the USB device 410. While the host device 400 is in the idle status, the CPU 414 controls the USB controller 416 not to transmit/receive data to/from the host device 400.

Figure 4B:
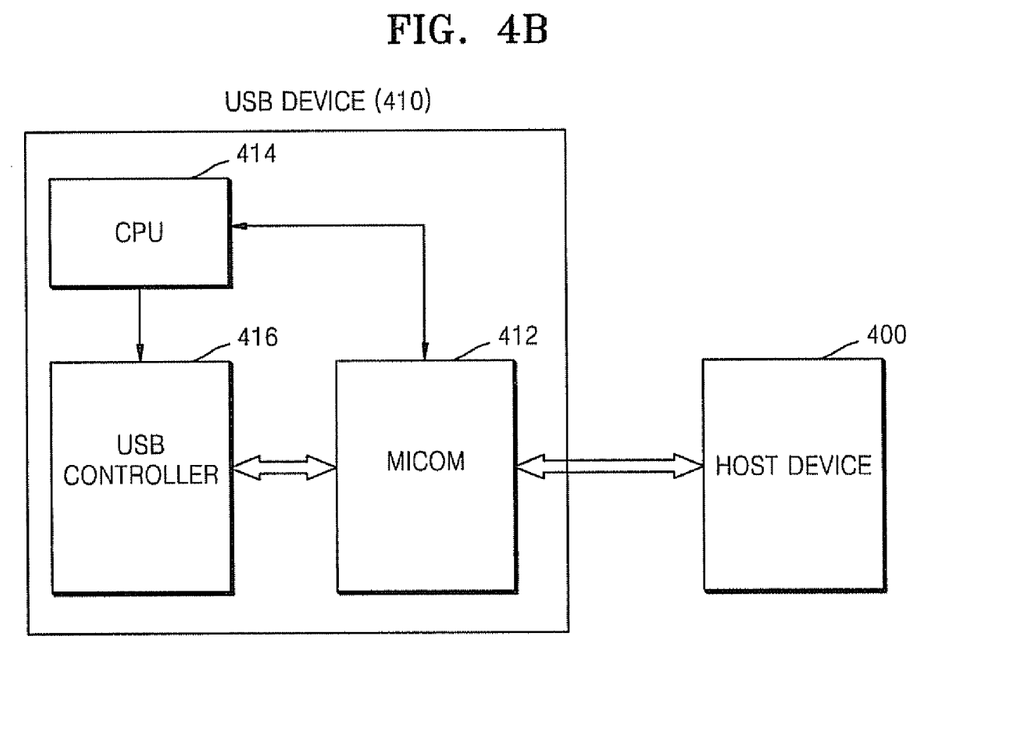
FIG. 4B illustrates an operation of the USB device illustrated in FIG. 4A when the status of the communications between the USB device and the host device is an operation status.

FIG. 4B illustrates an operation of the USB device 410 illustrated in FIG. 4A when the status of the communications between the USB device 410 and the host device 400 is an operation status. When the host device 400 operates and thus enters into an operation status, the MICOM 412 obtains data from the host device 400 indicating that the host device 400 is in an operation status and informs the CPU 414 that the host device 400 is in an operation status. The MICOM 412 delays transmission/reception of data between the host device 400 and the USB controller 416 by continuously transmitting a NACK packet to the host device 400. The MICOM 412 resumes the communications with the USB controller 416 from a stage where the USB controller 416 was stopped, with respect to the data that was transmitted/received between the host device 400 and the USB controller 416 and stored when the host device 400 was in an idle status.

The CPU 414 drives the USB controller 416 to transmit/receive data to/from the host device 400 when the MICOM 412 delays the data transmission/reception between the host device 400 and the USB controller 416 by continuously transmitting the NACK packet. As described above, when the CPU 414 drives the USB controller 416 to transmit/receive data to/from the host device 400, the USB controller 416 performs communications with the host device 400 by transmitting/receiving the data to/from the host device 400. The USB controller 416 transmits/receives next data because the previous data stored in the MICOM 412 has been restored. When the USB controller 416 and the host device 400 transmit/receive the next data to/from each other, the MICOM 412 relays the data transmitted/received between the USB controller 416 and the host device 400. Once the USB controller 416 and the host device 400 restart communications and transmit/receive data to/from each other, the MICOM 412 removes the stored data and stores the new data.

Figure 5:
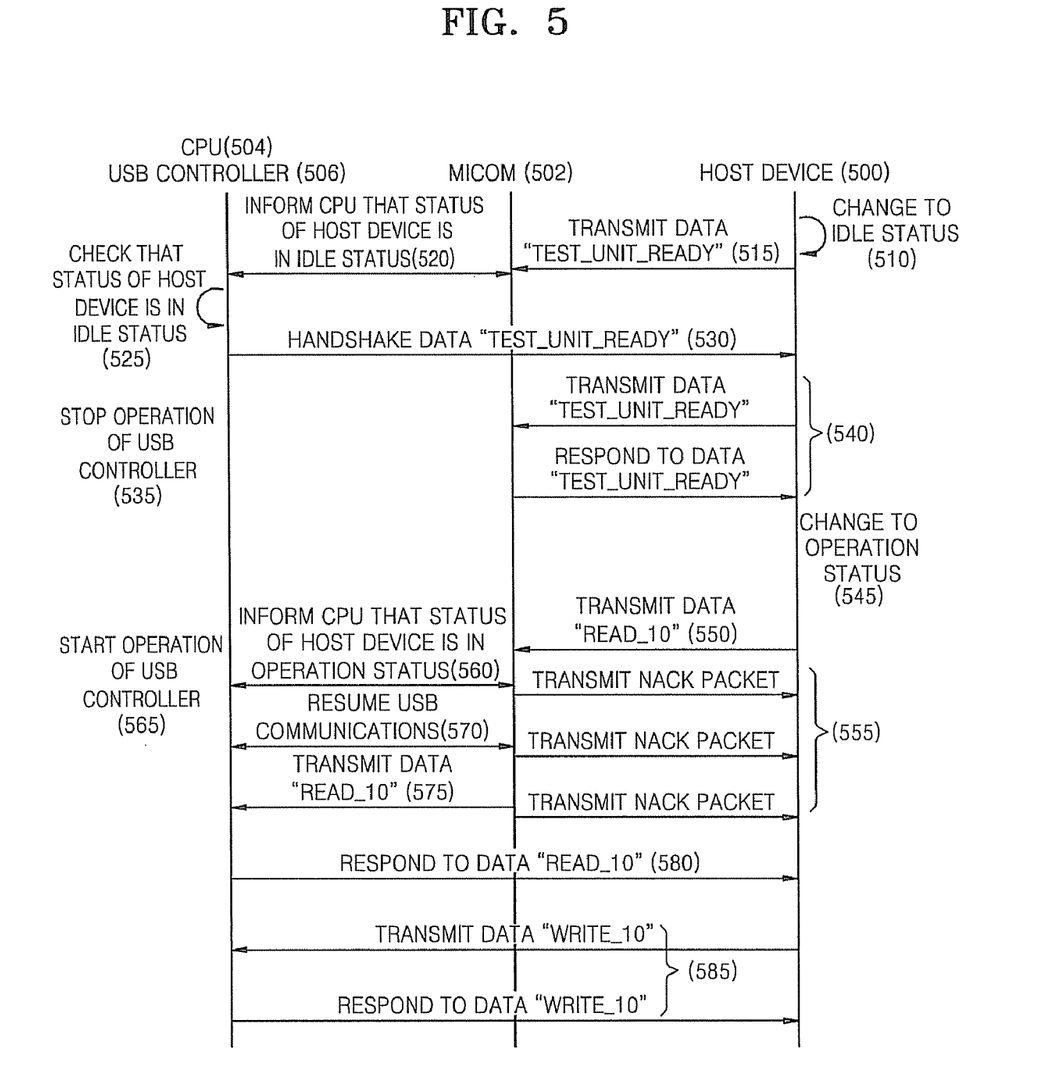
FIG. 5 is a flowchart of a process in which a USB device transmits/receives data to/from a host device according to a USB Mass-Storage Class specification, according to an embodiment of the present invention.

FIG. 5 is a flowchart of a process in which a USB device transmits/receives data to/from a host device 500 according to a USB Mass-Storage Class specification, according to an embodiment of the present invention. FIG. 5 shows a process of transmitting/receiving data between the USB device and the host device 500 when the status of the host device 500 changes from an idle status to an operation status as illustrated in FIGS. 4A and 4B. In FIG. 5, the data transmission/reception between the host device 500 and the USB device is illustrated with a MICOM 502 and a CPU 504/USB controller 506, into which the USB device is divided.

In operation 510, the host device 500 changes from an operation status to an idle status. In operation 515, the host device 500 transmits data indicating that the host device 500 is in the idle status to the MICOM 502. According to the USB Mass-Storage Class specification, the host device 500 informs the MICOM 502 that the host device 500 is in an idle status by transmitting data "TEST_UNIT_READY" to the MICOM 502. However, the data transmission performed to inform the idle status of the host device 500 may be replaced by another process, depending on the type of a USB class specification. For example, according to the MTP Class specification, the host device 500 does not transmit data, and, when no data is transmitted for a predetermined period, the MICOM 502 can recognize that the host device 500 is in an idle status.

In operation 520, the MICOM 502 informs the CPU 504 that the host device 500 is in the idle status. In operation 525, the CPU 504 confirms that the host device 500 is in the idle status. In operation 530, the USB controller 506 transmits to the host device 500 the data indicating that the host device 500 is in the idle status. According to the USB Mass-Storage Class specification, the USB controller 506 handshakes data "TEST_UNIT_READY" to the host device 500. At the same time, the MICOM 502 may relay the data transmitted in between the USB controller 506 and the host device 500.

In operation 535, the CPU 504 stops the operation of the USB controller 506 transmitting/receiving data to/from the host device 500, according to the policy of the USB device. Accordingly, when the host device 500 is in the idle status, the USB controller 506 does not directly transmit/receive data to/from the host device 500.

In operation 540, the host device 500 transmits data for confirming a connection with the USB device to the USB device. The MICOM 502 transmits data corresponding to the received data to the host device 500. Because a response to the data confirming the connection with the USB device is simple, the MICOM 502 instead of the USB controller 506 may transmit the corresponding data. Accordingly, the USB device is able to perform its other unique functions. According to the USB Mass-Storage Class specification, the host device 500 transmits data "TEST_UNIT_READY" to the MICOM 502, and the MICOM 502 responds to data "TEST_UNIT_READY". The USB device may now perform unique operations.

In operation 545, the host device 500 changes from the idle status to the operation status. In operation 550, the host device 500 transmits data to the MICOM 502 indicating that the host device 500 is in the operation status. When the host device 500 communicates with the USB device via USB, the host device 500 may inform the MICOM 502 that the host device 500 is in the operation status by transmitting the data being used. According to the USB Mass-Storage Class specification, the host device 500 may inform the MICOM 502 that the host device 500 is in the operation status by transmitting data "READ_10" to MICOM 502. In response to the data transmitted from the host device 500 to the MICOM 502, reception of the data corresponding to the transmitted data rather than of a simple response to the transmitted data is required.

In operation 555, the MICOM 502 transmits a NACK packet to the host device 500. Unlike the data transmitted to confirm the connection with the USB device, the data transmitted from the host device 500 to the MICOM 502 in operation 550 requires corresponding data, but the MICOM 502 may not be able to transmit the corresponding data. Accordingly, the MICOM 502 transmits the NACK packet to the host device 500 in order to delay the transmission of the corresponding data. The transmission delay continues until data communications between the USB controller 506 and the host device 500 resumes.

In operation 560, the MICOM 502 informs the CPU 504 that the status of the host device 500 has been changed to the operation status. In operation 565, the USB controller 506 re-operates to transmit/receive data to/from the host device 500. In operation 570, the USB controller 506 resumes the USB communications with respect to the data stored in the MICOM 502. The MICOM 502 stores the data transmitted/received between the USB controller 506 and the host device 500 while the host device 500 is in the idle status. The USB controller 506 restores the data stored in MICOM 502 and restores from an initial stage to a stage of the communications that was performed until the USB controller 506 was not in operation.

In operation 575, the MICOM 502 transmits the data received from the host device 500 to the USB controller 506. According to the USB Mass-Storage Class specification, the MICOM 502 transmits data "READ_10" to the USB controller 506. In operation 580, the USB controller 506 directly transmits/receives data to/from the host device 500 by transmitting the data corresponding to the data received from MICOM 502 to the host device 500. According to the USB Mass-Storage Class specification, the USB controller 506 responds to data "READ_10". The commands transmitted between the host device 500 and the USB device may be different from those given above, and may depend on the particular class of device to which the USB device belongs. In operation 585, the USB controller 506 performs USB communications by transmitting/receiving data to/from the host device 500. At this time, the MICOM 502 relays the data transmitted/received between the USB controller 506 and the host device 500.

The present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, DVDs, magnetic tapes, floppy disks, and optical data storage devices. Aspects of the present invention can also be embodied as carrier waves (such as data transmission through the Internet). The computer readable recording medium can also be distributed over network coupled computer systems an that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to control communications between a first device and a second device, the apparatus comprising:
   a controller to perform an operation for communications between the first device and the second device;
   a first processor to selectively stop the operation of the controller according to information indicating a status of the communications between the first device and the second device; and
   a second processor to obtain the information indicating the status of the communications between the first device and the second device, to perform an operation for the communications between the first device and the second device according to the obtained information, and to store content of communications between the first device and the second device that occur while the first device is in an idle status,
   wherein:
      the second device cannot perform a unique operation while communicating with the first device,
      the first processor stops the operation of the controller so as to permit the second device to perform the unique operation when the information indicates that the communications status is an idle status in which data for an operation between the first device and the second device is not exchanged, and
      the controller resumes the stopped operation for the communications between the first device and the second device based on the stored communications content when the first device returns to an operational status.

2. The apparatus of claim 1, wherein the first processor sustains the operation of the controller when the information indicates that the communications status is an operation status in which data for an operation between the first device and the second device is exchanged.

3. The apparatus of claim 1, wherein the first processor stops the operation of the controller according to the information obtained by the second processor.

4. The apparatus of claim 1, wherein:
   the information is obtained by a microcomputer that is located outside the second device and carries out the operation of the first processor by proxy.

5. The apparatus of claim 1, wherein the first device is a host device, the second device is a USB (universal serial bus) device, and the first device and the second device communicate with each other via USB.

6. A communications controlling method performed in a second device that communicates with a first device, the method comprising:
   obtaining information indicating the status of the communications between the first device and the second device;
   selectively stopping an operation of a controller controlling the communication between the first device and the second device according to the obtained information;
   storing content of communications between the first device and the second device that occur while the first device is in an idle status; and
   when the first device returns to an operational status, restoring communications between the first device and the second device based on the stored content,
   wherein the selectively stopping an operation comprises stopping the operation of the controller so as to permit the second device to perform the unique operation when the information indicates that the communications status is an idle status in which data for an operation between the first device and the second device is not exchanged.

7. The method of claim 6, wherein:
   the selectively stopping of the operation comprises stopping the operation for the communications between the first device and the second device; and
   the operations for the communication between the first device and the second device are performed by a third device instead of the second device.

8. The method of claim 6 wherein the selectively stopping of the operation comprises sustaining the operation for the communications between the first device and the second device when the obtained information represents that the communications status is an operation status where data for an operation between the first device and the second device is exchanged.

9. A computer readable recording medium having recorded thereon a program to execute the method of claim 6.

10. A system to control communications between a plurality of devices, the system comprising:
    a first device;
    a second device to perform an operation for communications with the first device and to stop the operation according to information indicating a status of the communication with the first device; and
    a third device to perform an operation for the communications between the first device and the second device according to the information indicating the status of the communications between the first device and the second device and to store content of communications between the first device and the second device that occur while the first device is in an idle status,
    wherein the second device stops the operation for communications with the first device so as to permit the second device to perform the unique operation when the information indicates that the communications status is an idle status in which data for an operation between the first device and the second device is not exchanged, and the second device resumes the stopped operation for the communications between the first device and the second device based on the stored communications content when the first device returns to an operational status.

11. An apparatus to communicate with a host via USB so as to allow a unique operation to be performed while the apparatus is connected to the host, the apparatus comprising:
- a USB controller to communicate with the host via USB;
- a CPU to selectively stop the USB controller based on information indicating a status of the communication between the apparatus and the host and to control the apparatus to perform a unique operation; and
- a microcomputer to obtain the information and to communicate with the host based on the information and to store content of communications between the host and the second apparatus that occur while the host is in an idle status,
- wherein the CPU stops operation of the USB controller so as to permit the apparatus to perform the unique operation when the information indicates that the communication status is an idle status in which data is not exchanged between the host and the apparatus via USB, and when the host returns to an operational status, resumes the stopped operation for the communications between the host and the apparatus based on the stored communications content.

12. The apparatus of claim 11, wherein the CPU sustains operation of the USB controller when the information indicates that the status is an operation status in which data is exchanged between the host and the apparatus via USB.

13. The apparatus of claim 12, wherein, when the status changes from the idle status to the operation status, the microcomputer delays a communication between the host and the apparatus until the USB controller is able to communicate with the host.

14. The apparatus of claim 13, wherein the microcomputer delays the communication between the host and the apparatus by transmitting a NACK packet to the host device.

15. The apparatus of claim 11, wherein the information indicating that the status is an idle status is a TEST_UNIT_READY packet.

16. The apparatus of claim 11, wherein the information indicating that the status is an idle packet is a failure by the host to communicate with the apparatus for a predetermined period of time.

17. The apparatus of claim 4, wherein:
- the microcomputer exchanges data between the first device and the second device instead of the controller while the status is an idle status in which data for an operation between the first device and the second device is not exchanged.

* * * * *